United States Patent [19]

Gest et al.

[11] Patent Number: 4,896,291

[45] Date of Patent: Jan. 23, 1990

[54] VALUATOR MENU FOR USE AS A GRAPHICAL USER INTERFACE TOOL

[75] Inventors: Stephen B. Gest; Farrell W. Wymore, both of Austin, Tex.

[73] Assignee: International Business Machines Corporation, Armonk, N.Y.

[21] Appl. No.: 196,922

[22] Filed: May 20, 1988

[51] Int. Cl.⁴ .............................................. G06F 3/00
[52] U.S. Cl. ................................... 364/900; 340/703; 340/709; 340/724; 340/735; 364/948.2; 364/948.21; 364/300
[58] Field of Search ...................... 364/200, 300, 900; 340/703, 709, 724, 735

[56] References Cited

U.S. PATENT DOCUMENTS

| | | | |
|---|---|---|---|
| Re. 32,632 | 3/1988 | Atkinson | 340/709 |
| Re. 32,773 | 10/1988 | Goldwasser et al. | 364/900 X |
| 4,692,858 | 9/1987 | Redford et al. | 364/200 |
| 4,694,286 | 9/1987 | Bergstedt | 340/703 |
| 4,739,314 | 4/1988 | McCaskill et al. | 340/709 |
| 4,772,882 | 9/1988 | Mical | 340/709 |

OTHER PUBLICATIONS

R. M. Bateman et al., "Method for Concurrent Support of Pop-Up Window Selection Techniques", IBM Technical Disclosure Bulletin, vol. 30, No. 10, 3/88, p. 61.

L. Koved et al., "Embedded Menus: Selecting Items in Context", Communications of the ACM, 4/86, vol. 29, No. 4, pp. 312-318.

*Primary Examiner*—Raulfe B. Zache
*Attorney, Agent, or Firm*—Marilyn D. Smith

[57] ABSTRACT

The system and method provides a user interface tool for simultaneously selecting a menu item and a value, from a range of values, for the menu item. The user interface tool is referred to as a valuator menu, since it allows both the selection of a value from a range of values, and the selection of a menu item from a menu list. As a user moves a cursor over a menu of selectable items on a screen display, the item underneath the cursor is highlighted. In addition, as the user moves the cursor within the highlighted menu item, a value relative to the position of the cursor within that menu item is displayed. This valuator value is dynamically updated as the cursor position changes within the menu item. When the user performs an input selection, i.e. through a mouse button or a keyboard interaction, both the selected menu item and the value, relative to the cursor position, are simultaneously returned to the application program running on the data processing system.

19 Claims, 8 Drawing Sheets

```
Stopped in: hello.c              Function: main              Line: 10
Displaying: hello.c              Pid: 1082                   Address: 0x100001c0
    1    #include <stdio.h>              20        17 FORMATS    31
    2                                   101        string
    3                                               octal byte    102
    4    main( )                                    ascii byte    103
    5    {                                          short dec     104
    6        int    i, j, k;                        long dec      105
    7                                               single float  106
    8        i = 99 ;                               double float  107
    9        j = 0 ;                                short octal   108
   10 »    k = i + j ;              110            long octal    109
   11                                111           short hex
   12            insert( "world", 2 );                            18
                                                   long hex      112
   10 »0x100001c0 (main+0xc)  7051  ls   r5,       machine inst
        0x100001c2 (main+0xe)  7141  ls   r4,              FORMATS
        0x100001c4 (main+0x10) 6354  cas  r3,
        0x100001c6 (main+0x12) 3231  sts  r3,8(r14)
   12   0x100001c8 (main+0x14) 712e  ls   r2,4(r14)                 22
        0x100001ca (main+0x16) a432  lis  r3,2
        0x100001cc (main+0x18) 8df00028 balix r15,1000021c (insert)
        0x100001d0 (main+0x1c) 720e  ls   r0,8(r14)

$r0: 0x00000063    $fp: 0x3fffe5e0    $r2: 0x00000001    $r3: 0x3fffe624
  $r4: 0x3fffe62c    $r5: 0x20000a54    $r6: 0x20004d7c    $r7: 0x00000003
  $r8: 0x00000000    $r9: 0x00000001    $r10: 0x00000011   $r11: 0x00000005
  $r12: 0x2001922c   $r13: 0x3fffe618   $r14: 0x200003e8   $link: 0x00000000
  $iar: 0x100001c0   $cs: 0x0010        $ics: 0x0004       $aq: 0x20018190

$fr0: 0x7fffffffffffffff  $fr1: 0x7fffffffffffffff  $fr2: 0x7fffffffffffffff
  $fr3: 0x7fffffffffffffff  $fr4: 0x7fffffffffffffff  $fr5: 0x7fffffffffffffff 100001d0:  720e 0802 732e c831 0000 8df0 007b 740e
100001e0:  0802              28
(xdbx) 0x100001c0/17x
100001c0:  7051 7141 6354 3231 712e a432 8df0 0028  ⎫
100001d0:  720e 0802 732e c831 0000 8df0 007b 740e  ⎬  24
100001e0:  0802                                     ⎭
(xdbx)
```

F I G . 3

VALUATOR MENU FOR USE AS A GRAPHICAL USER INTERFACE TOOL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to data processing systems having a display, and more particularly, to a user interface for selecting items from a menu displayed to a user.

DESCRIPTION OF THE RELATED ART

Windows, icons, mouse interactions, and pop-up menu systems are part of a computer user interface known in the art. A typical user interface may include a valuator tool. A valuator tool is a representation of a gauge which graphically presents a value over some range of values. As shown in FIG. 1, a dial 11 and a slide bar 12 are examples of valuator tools. The user of such a tool can graphically manipulate the valuator to indicate different values. The valuator tool returns, upon manipulation, a value with respect to its valuator type. For example, a volume control device could be represented by a slide bar 12 with graduated increments along the bar, as shown. Manipulating the slide bar returns the specified increment along the bar, thus increasing or decreasing the volume of the device.

A menu tool 14, as shown in FIG. 1, is a window containing a series of selectable items that appears when a specific mouse button(s) is pressed. The menu may appear at the current location of the mouse cursor, ("pop-up" menu), or appear below the menu's title when the user presses a mouse button(s) within that title, ("pull-down" menu).

Menu items are words or phrases that describe some type of operation that the application can perform. The user selects an item from the menu by invoking the menu, (pressing and holding down a mouse button(s)), moving the mouse cursor so that it points to the item to be selected, and releasing the mouse button(s). As the mouse cursor moves from menu item to menu item, the item currently being pointed to by the cursor is highlighted in some fashion, usually reverse video. Releasing the mouse button(s) on a highlighted item selects that item and causes the application to perform that operation.

The problem with current technology is that often it is necessary to provide parameters for operations selected from a menu. Currently, these parameters are provided by invoking some dialog between the user and the application either before or after the selection is made. Dialogs are invoked before selections are made when all the operations for a given menu possess some common subset of parameters. Users supply the requested parameters via a dialog of additional keystrokes and/or mouse actions. For a commonly performed operation, this dialog is both annoying and time consuming for the user of the application.

SUMMARY OF THE INVENTION

An object of this invention is to economize the user's interaction in specifying multiple pieces of information to an application running on a processing system.

A further object of this invention is to reduce the number of input selections, such as through the number of keystrokes on a keyboard or through mouse movement and button selection, required by a user in a user interface.

The valuator menu addresses the above mentioned problems by providing a convenient way for the user to specify multiple pieces of information to the application with a reduced number of interactions.

The valuator menu combines the valuator tool and the menu tool to create a unique interactive tool from which the user can specify multiple pieces of information to the application program, running on the processing system, in an effective and economical manner. The user specifies this information to an application by selecting a choice from a menu, while simultaneously selecting a value, from a range of values, specific to each menu choice.

The user selects a menu item by moving the mouse cursor vertically over the menu in the manner described above. The user can additionally select a valuator value, from a range of values, by moving the cursor horizontally over the menu. The current valuator value is displayed within the menu, and is dynamically updated with respect to the mouse cursor's horizontal position within the menu item. The valuator value may be in any range, and adjusted to any appropriate scale.

Releasing the mouse button(s) over a highlighted menu item returns multiple pieces of information to the application via a single mouse operation. The information returned consists of the selected menu operation to be performed, and a valuator value pertaining to that operation.

BRIEF DESCRIPTION OF THE DRAWING

FIG. 3 illustrates a screen display output of the valuator menu in a preferred embodiment.

DESCRIPTION OF THE PREFERRED EMBODIMENT

Figure 1:
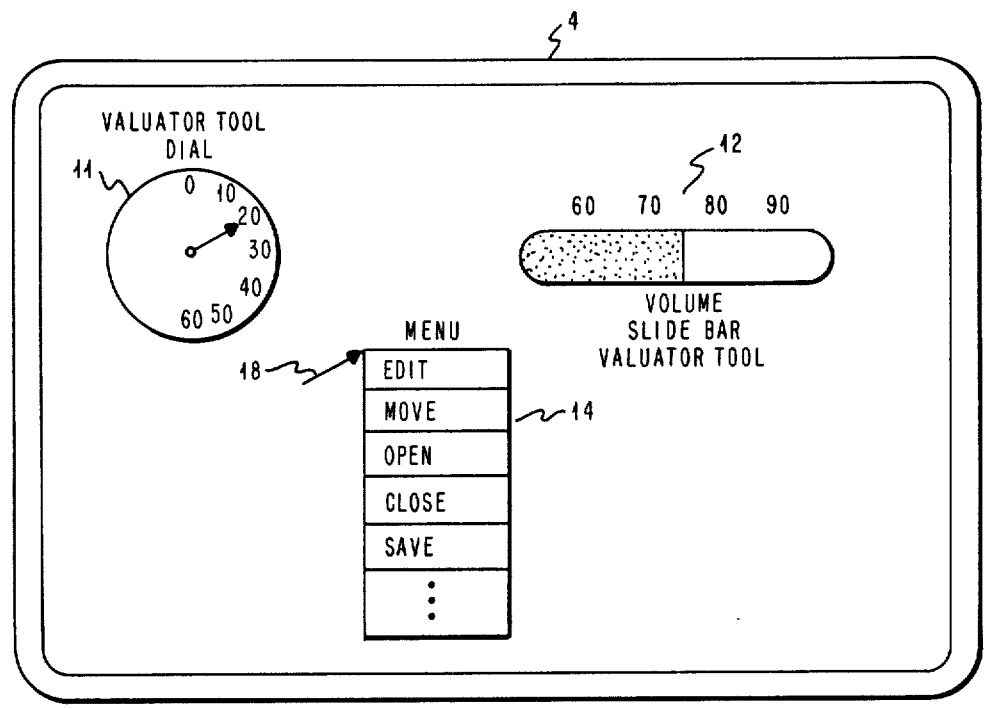
FIG. 1 illustrates a dial valuator tool, a slide bar valuator tool, and a pop-up menu, all known in the art as graphical user interface tools.
Figure 2A:
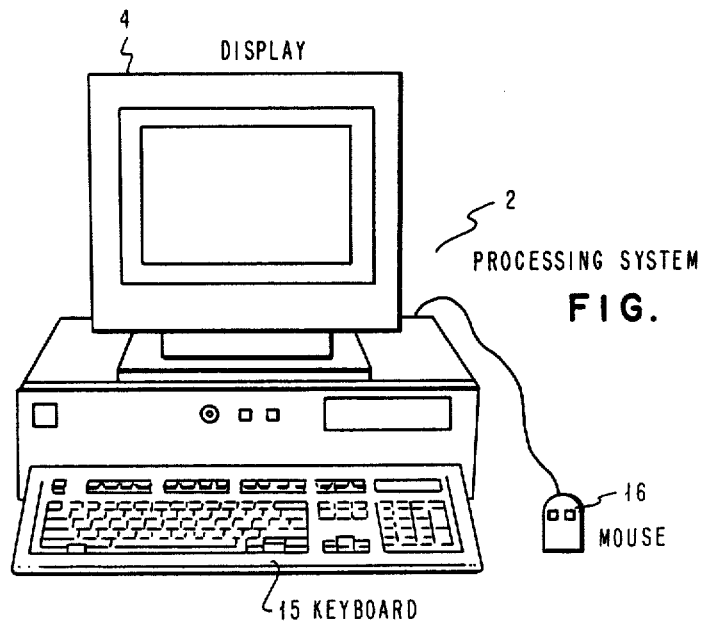
FIG. 2A illustrates the hardware including a display of a processing system for utilizing this invention.
Figure 2B:
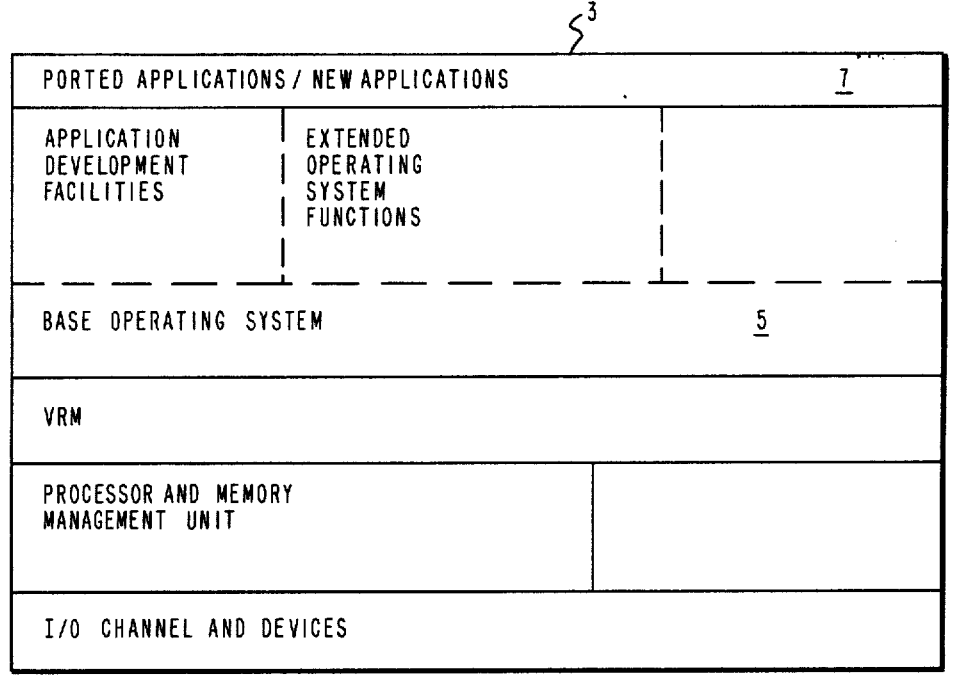
FIG. 2B illustrates the logical structure of the processing system of the preferred embodiment.
Figure 2C:
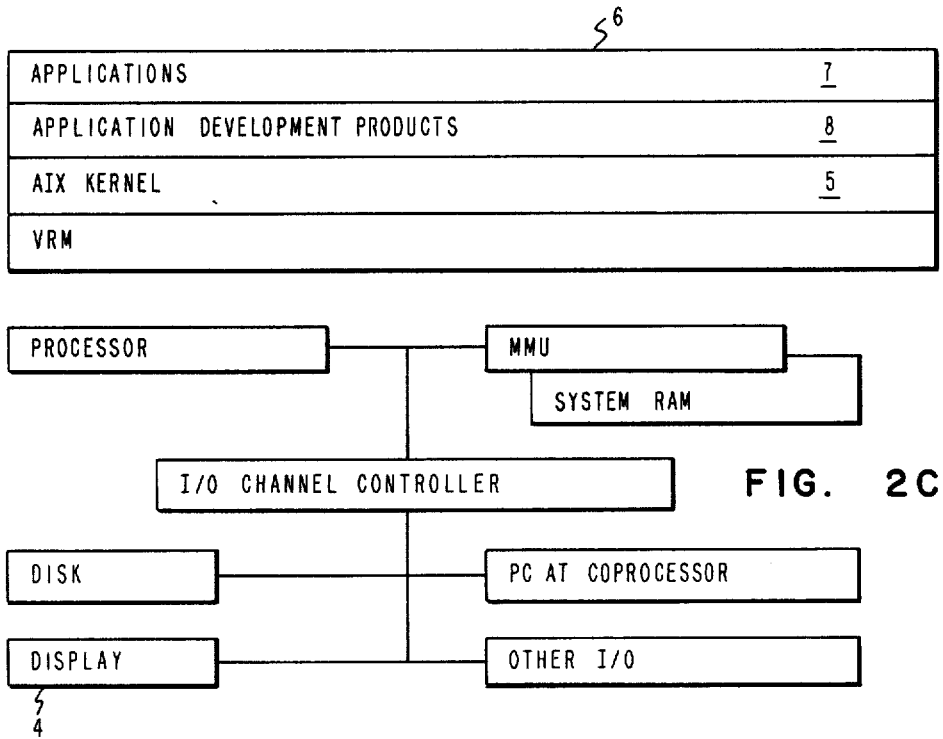
FIG. 2C illustrates the physical structure of the processing system of the preferred embodiment.

The preferred embodiment of the present invention was targeted for the IBM RT PC 2, FIGS. 2A, 2B, 2C, running the AIX operating system 5. The valuator menu of the present invention could be utilized with display 4, FIG. 2A provided with the processing system 2. FIG. 2B shows the logical structure 3 of the processing system 2, FIG. 2A, FIG. 2C shows the physical structure 6 of the processing system 2, FIG. 2A.

For more information on the RT PC, and the AIX operating system, the following references are herein incorporated by reference. Bach, M. J., *The Design of the UNIX Operating System*, Prentice Hall, 1986. Lang, T. G. and Mothersole, T. L., *Design of the RTPC VRM Nucleus*, Sept. 1, 1986. *AIX Operating System Commands Reference*, IBM Corporation, SC23-0790. *AIX Operating System Managing the AIX Operating System*, IBM Corporation, SC23-0793. *AIX Operating System Programming Tools and Interfaces*, IBM Corporation, SC23-0789. *AIX Operating System Technical Reference*, Volumes 1 and 2, IBM Corporation, SC23-0808 and SC23-0809. *IBM RT Personal Computer Technology*, IBM Corporation, SA23-1057, 1986. *Virtual Resource Manager Technical Reference*, Volumes 1 and 2, IBM Corporation, SC23-0816 and SC23-0817.

The valuator menu user interface tool of this invention is a vehicle with which a user can specify several pieces of information for a commonly used operation with a minimal amount interaction.

Figure 2D:
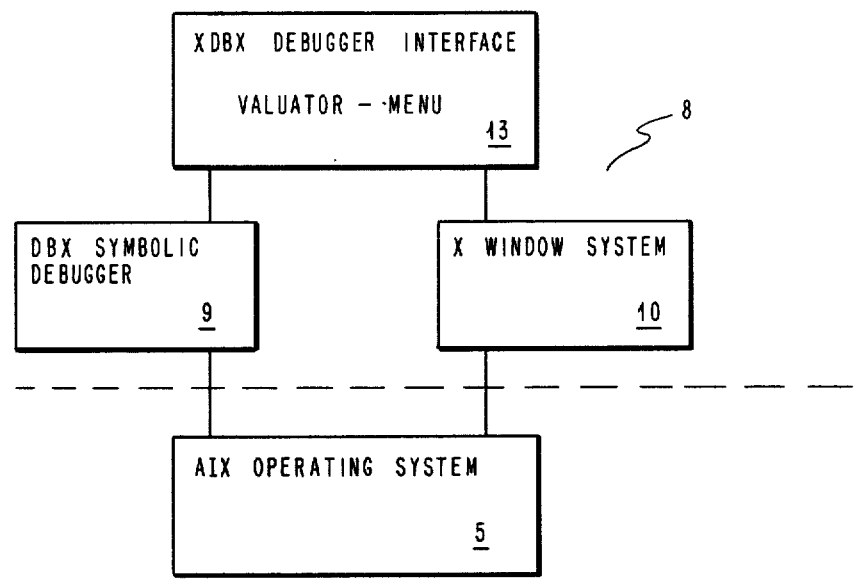
FIG. 2D illustrates the software components of the preferred embodiment.

The present invention was first implemented in an embodiment comprising an application called "Xdbx" 13 FIG. 2D that presents a modern interface to the "dbx" symbolic debugger 9. This interface improves the general presentation and usability of the dbx symbolic debugger. The dbx and Xdbx symbolic debuggers are described in the *IBM RT PC Programming Tools and Interfaces*, Version 2.2, IBM Corporation, which is herein incorporated by reference. The features of this invention are a part of the *IBM RT PC Advanced Interactive Operating System Extended Services Program*, which is herein incorporated by reference.

As shown in FIG. 2D, the Xdbx debugger interface 13 and the dbx symbolic debugger 9, along with X-Windows 10, are application development products 8 as shown in FIG. 2C.

The interface 13 makes use of the X-Windows system 10, which supplies most of the primitive window management tools that allow more complex tools, like the valuator menu, to be built. More information on X-Windows can be found in *IBM RT PC X-Windows Version 1.1, X-Windows User Guide & Reference*, September 1987, which is herein incorporated by reference. The Xdbx debugger 13 allows the user to specify each dbx operation 9, giving the user complete functionality, without being constrained by each operation's syntax.

One commonly used operation in the dbx symbolic debugger 9 is the ability to list assembly instructions 22, FIG. 3, or display the contents of an address 26 as shown by contents 24. These operations require three pieces of information: an address 26, the number of memory items to display 20, and a mode specifying how to display the memory 110. A shown in FIG. 3, Dbx supports the following display modes: string 101, octal byte 102, ascii byte 103, short decimal 104, long decimal 105, single precision float 106, double precision float 107, short octal 108, long octal 109, short hexadecimal 110, long hexadecimal 111, and machine instruction 112.

Figure 4:
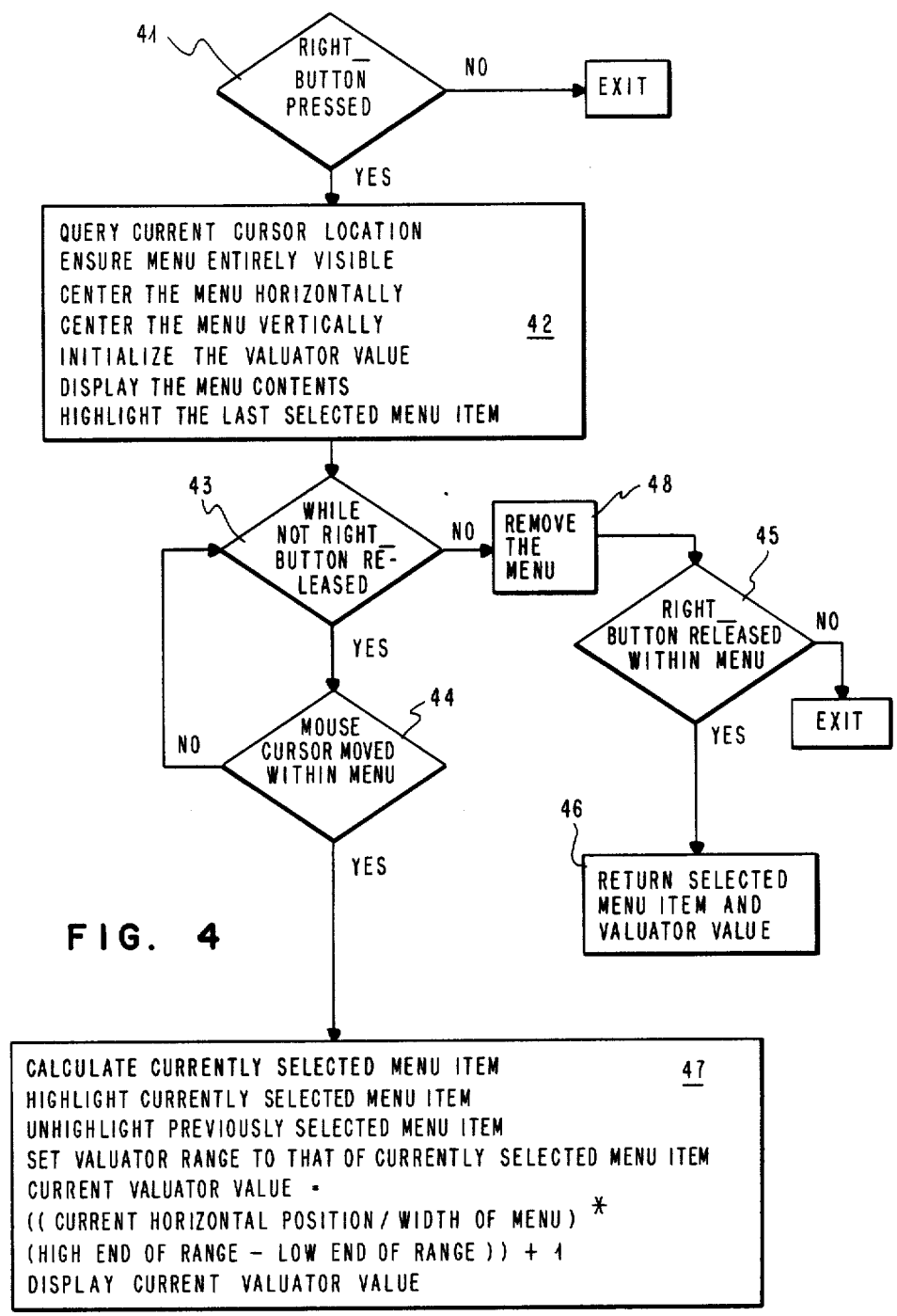
FIG. 4 illustrates a flow chart for implementing the valuator menu of the present invention.

With reference to both FIG. 3 and FIG. 4, the valuator menu tool allows the user to specify the above information to Xdbx in an economical and effective manner. The user selects the starting address 26 of the range of memory to display by moving the mouse cursor 18 so that it points to that address 26 and clicking the left mouse button 16, FIG. 2A. The selected address 26 would then be highlighted in reverse video as shown.

Having selected the starting address 26, the user could invoke the valuator menu by pressing and holding down the right mouse button, step 41 FIG. 4. As shown in FIG. 3, the user moved the cursor to another location on the screen to enhance clarity of FIG. 3 before invoking the valuator menu. However, this is not necessary, as the valuator menu 31 could appear at location 26.

Nevertheless, the valuator menu 31 appears centered horizontally about the current mouse cursor location, step 42. The valuator menu 31 is positioned vertically such that the cursor appears over the same menu item 110 that was previously selected, or over the first menu item 101, if it is the first time that the valuator menu 31 is invoked.

The user can simultaneously select a menu item, i.e. a display mode 101-112, and one of a number of values, i.e. number of memory items 20, to be displayed. The user could select a display mode 101-112 by moving the mouse cursor vertically over the valuator menu 31. As the mouse cursor moves from menu item to menu item, the item 110 currently being pointed to by the cursor 18 is highlighted in reverse video, step 42, FIG. 4.

Simultaneously, the user could select one of a number of values, i.e. memory items 20, to be displayed by moving the cursor horizontally over the valuator menu 31, step 44. As the user moves the cursor horizontally within the menu 31, the valuator value 20 is updated with respect to the cursor's horizontal position, step 47. Since the menu is initially centered about the mouse cursor, the initial value represents a mid range value of the range specified.

The menu items 101-112 would consist of the possible memory display modes, while the valuator value 20 would represent the current number of memory items to display. Releasing the right button over a highlighted display mode, step 45, returns both that display mode 110, and the number of memory items to display 20, back to the Xdbx program via one single mouse button release, step 46. With this information, Xdbx could now invoke the dbx operation to display a memory range 24, preserving the dbx syntax as shown by output 28, FIG. 3. The dbx syntax "0x100001c0/17x" means that beginning at memory location 0x100001c, seventeen 16 bit integers, i.e. short integers, will be displayed as hexadecimal numerals. These seventeen integers are shown as numeral 24 in FIG. 3.

For this commonly used operation, the valuator menu was the perfect vehicle to allow the user to specify multiple pieces of information in an efficient and economical fashion.

The following program design language code illustrates the above operation:

```
if ( right__button pressed ) {
    query the current mouse cursor location;
    adjust the menu such that it is entirely visible;
    center the menu horizontally about the current
    mouse cursor location;
```

```
center the menu vertically about the last selected
    memory display mode;
set the valuator_value to .5 * valuator_range;
display the menu title, menu items, and valua-
    tor_value;
highlight the last selected memory display mode in
    reverse video;
while ( not right_button released ) {
    if ( mouse cursor moved within menu ) {
        calculate currently selected memory
            display mode;
        highlight currently selected memory
            display mode;
        unhighlight previously highlighted memory
            display mode;
        calculate the current valuator_value =
            (( current horizontal position /
            width of menu ) * (upper
            range—lower range))
            +1;
        display current valuator_value represent-
            ing number of memory items to
            display;
        }
    }
/* right_button released */
remove the menu;
if ( right_button released within menu )
    display the number of memory items indicated
        by the valuator_value in the selected
        memory mode;
}
```

Copyright IBM Corporation 1988

The program design language code listed above is specific to this preferred embodiment. However, the valuator menu of the present invention is not limited to the specific application as described in reference to the previous embodiment employing the Xdbx debugger. For a more general embodiment, references to memory items, display modes, and memory modes would be replaced by other words representing a different embodiment. Generally, for other embodiments, the selected action will be implemented with the valuator value as its argument.

The valuator menu technique can be implemented in a host of other applications. For example, this tool can be used to specify a certain hue of a particular color. FIG. 5A through FIG. 5F illustrate sequences of a menu as a cursor is moved to simultaneously specify a certain hue of a particular color. The valuator menu items 51-58 could consist of the range of possible colors starting with white 51 and ending with black 58. The valuator value 20 would represent the amount of saturation for the color currently being pointed to by the mouse cursor, which is highlighted in reverse video. For this example, the valuator value 20 might range from 0 to 1 in increments of hundredths, indicating the saturation of the color. Moving vertically over the menu would select a color, while moving horizontally within the menu would change the amount of saturation for that particular color.

Figure 5A:
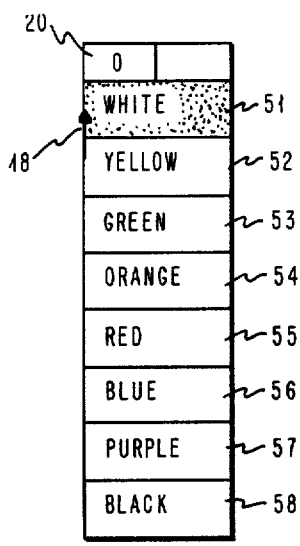
FIGS. 5A-5F illustrates various screen displays showing the function of the valuator menu in simultaneously selecting a menu item and a value of the menu item in another embodiment of the invention.
Figure 5B:
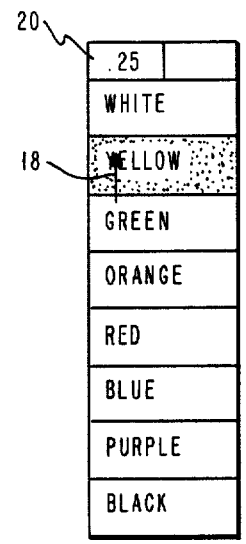
Figure 5C:
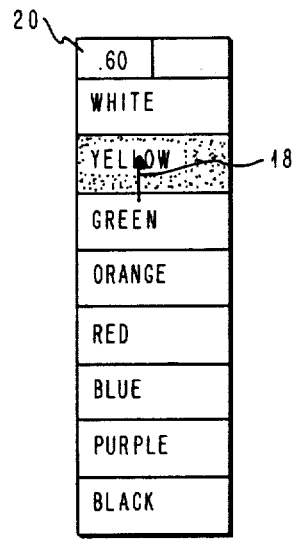
Figure 5D:
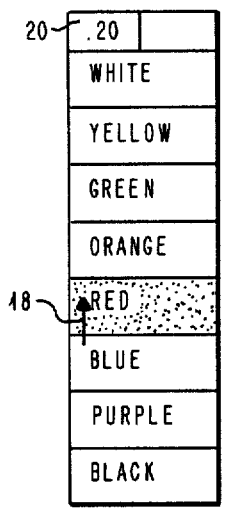
Figure 5E:
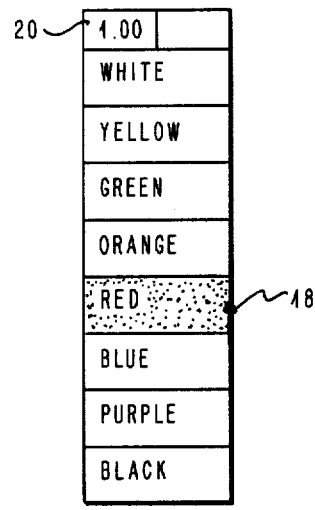
Figure 5F:
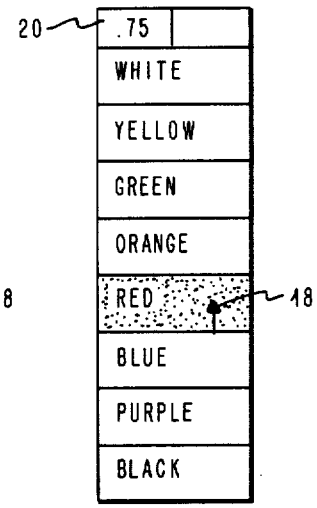

As shown in FIG. 5A, the cursor 18 is pointing to color white 51 at the farthest left position indicating a zero saturation level as shown by the valuator value 20. In FIG. 5B the cursor is moved down vertically to the yellow color item 52. As the cursor 18 is also moved horizontally to the right, the valuator value 20 changes dynamically with the horizontal position indicating a change in the value of the saturation level that may be selected by the user. FIG. 5C illustrates the dynamic change in the valuator value 20 as the cursor 18 location changes its relative horizontal position. FIGS. 5D, 5E, and 5F also illustrate this dynamic change in the valuator value 20 as the cursor 18 location changes its relative horizontal position.

In this manner, the user could select simultaneously a color item 51-58 and one of a plurality of saturation levels for the color item, in one click of the mouse button. The following program design language code further illustrates the simultaneous selection of two items with one user input action.

```
Copyright IBM Corporation 1988
if ( right_button pressed ) {
    query the current mouse cursor location;
    adjust the menu such that it is entirely visible;
    center the menu horizontally about the current
        mouse cursor location;
    center the menu vertically about the last selected
        color;
    set the saturation value to .5 * saturation range;
    display the menu title, menu color items, and
        saturation value;
    highlight the last selected color item in reverse
        video;
    while ( not right_button released ) {
        if ( mouse cursor moved within menu ) {
            calculate currently selected color item;
            highlight currently selected color item;
            unhighlight previously highlighted color
                item;
            calculate the current saturation value =
                (( current horizontal position /
                width of menu ) * saturation
                range ) +1;
            display current saturation value;
            }
        }
    /* right_button released */
    remove the menu;
    if ( right_button released within menu )
        return selected color and saturation value
            to the application;
    }
```

Another embodiment of the valuator menu is as a user interface tool that allows the user to simultaneously select a font style and a character pitch for that font. FIG. 6A through FIG. 6D illustrates a possible sequence of a visual representation on a display as the cursor 18 is moved throughout the menu 31. FIGS. 6A-6D also illustrate that the menu items 61-66 can be listed horizontally instead of vertically as previously shown. Also, the selection of the pitch, i.e. the valuator value, could also occur relative to the same horizontal direction as the menu items 61-66. As the cursor 18 is moved into a new menu item, the valuator value 20 would reset for the new menu item.

In this embodiment, as shown in FIGS. 6A-6D, the valuator menu items 61-66 would represent the possible font styles, while the valuator value 20 would represent the possible character pitches for each font style. This range of character pitches could be different for each font. Moving over the menu 31 would select a different font style, while simultaneously changing the range of the valuator values 20, i.e. character pitches, associated with the selected font style. Moving the cursor within the menu item would update the value with the possible character pitches for that particular font style.

Figure 6A:
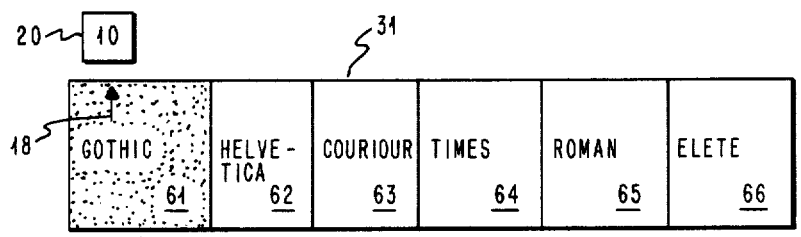
FIGS. 6A-6D illustrates various screen displays showing the function of the valuator menu in simultaneously selecting a menu item and a value of the menu item in another embodiment of the invention.
Figure 6B:
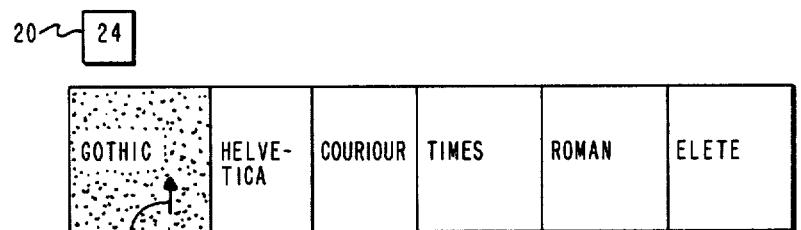
Figure 6C:
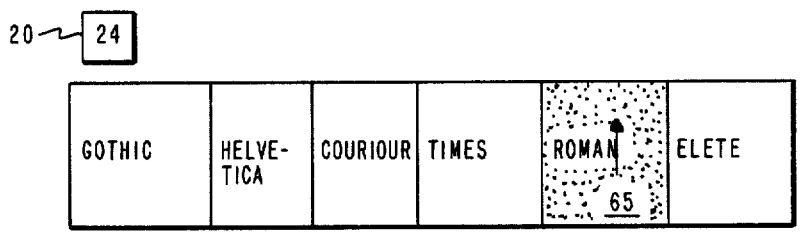
Figure 6D:
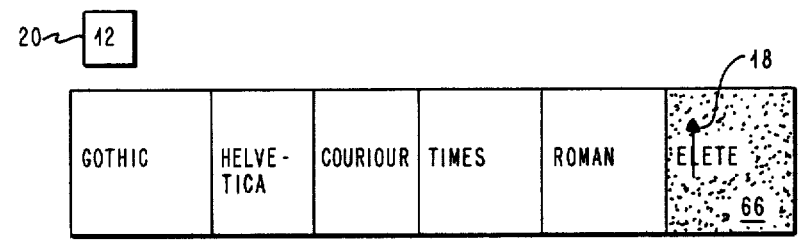

As shown in FIG. 6A, the cursor location indicates menu item 61 in reverse video, with a character pitch of 10, as indicated by the valuator value 20. As the cursor 18 position is moved horizontally, (the vertical positioning of the cursor 18 is not relevant in this embodiment)

the character pitch changes to 24 as indicated by valuator value 20 in FIG. 6B. As shown in FIG. 6C, the Roman font style 65 is indicated in reverse video by the cursor 18 position, along with the 24 character pitch as indicated by valuator value 20. As the cursor 18 position is moved horizontally to the right as shown in FIG. 6C, the valuator value resets relative to the next menu item 66. The relative cursor 18 position within menu item 66. FIG. 6D, indicates simultaneously the menu item 66 is to be selected along with a character pitch of 12.

The following program design language code illustrates this embodiment as shown in FIGS. 6A-6D.

```
if ( right_button pressed ) {
query the current mouse cursor location;
adjust the menu such that it is entirely visible;
center the menu horizontally about the current
mouse cursor location;
center the menu vertically about the last selected
font style item;
set the character pitch value to .5 * pitch range
of last selected font style item;
display the menu title, font style items, and
character pitch value;
highlight the last selected font style item in
reverse video;
while ( not right_button released ) {
if ( mouse cursor moved within menu ) {
calculate currently selected font style
item;
highlight currently selected font style
item;
unhighlight previously highlighted font
style item;
set character pitch range to that of the
currently selected font style item;
calculate the current character pitch
value =
(( current horizontal position /
width of menu ) * pitch range ) +
1;
map character pitch value to pitch value
range
display current mapped character pitch
value;
}
}
/* right_button released */
remove the menu;
if ( right_button released within menu )
return selected font style and character
pitch value to the application;
}
```
Copyright IBM Corporation 1988

Figure 7A:
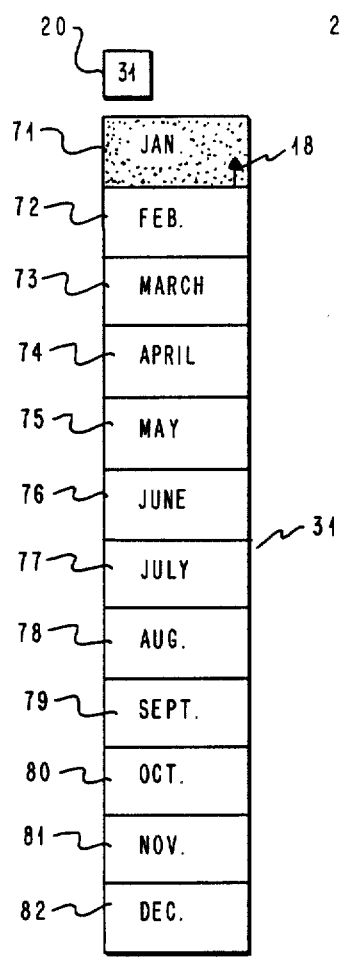
FIGS. 7A-7C illustrates various screen displays showing the function of the valuator menu in simultaneously selecting a menu item and a value of the menu item in another embodiment of the invention.
Figure 7B:
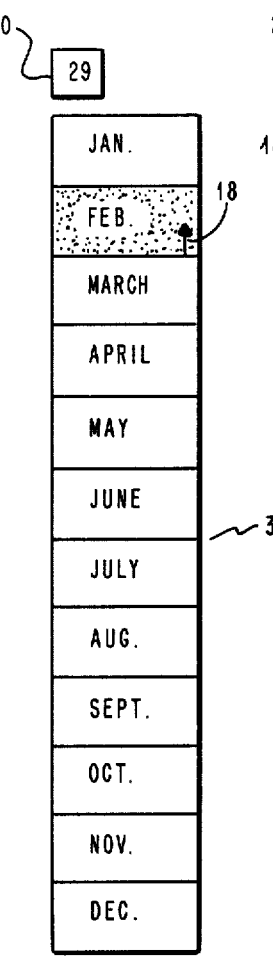
Figure 7C:
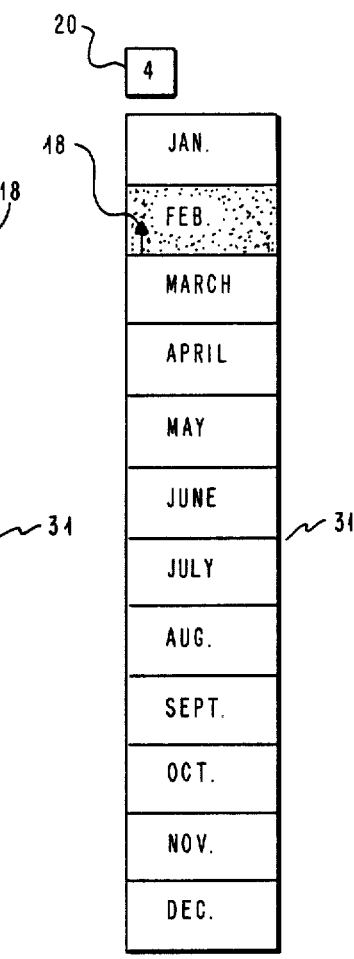

A further embodiment of the present invention employs a calendar menu as shown in FIGS. 7A-7C. With the user interface of the present invention, a user could check the plans for a particular day of the year in an economical manner. The valuator menu items 71-82 would represent the months of the year, while the valuator value 20 would represent the days for each month. The range of days per month would obviously change per month, as shown in FIG. 7A and FIG. 7B with respect to the same relative position of the cursor 18 in the menu item, and the different resulting valuator value 20.

As shown in FIGS. 7A-7C, moving the cursor 18 vertically over the menu 31 would select a menu item 71-82 in reverse video. The range of the valuator value 20 would change relative to the highlighted menu item. Moving the cursor 18 horizontally within the menu 31 would update the value 20 displayed representing the day for the particular month highlighted. With this information, an application could display the user's agenda for that particular day of the year. The user simultaneously selected a menu item (month), and a value (a particular day) of that selected menu item with one user input selection.

The following program design language code illustrates the preferred embodiment as previously described.

```
if ( right_button pressed ) {
query the current mouse cursor location;
adjust the menu such that it is entirely visible;
center the menu horizontally about the current
mouse cursor location;
center the menu vertically about the last selected
month item;
set the day of the month value to .5 * range of
days of last selected month item;
display the menu title, month items, and day
value;
highlight the last selected month item in reverse
video;
while ( not right_button released ) {
if ( mouse cursor moved within menu ) {
calculate currently selected month item;
highlight currently selected month item;
unhighlight previously highlighted month
item;
set range of days to that of the currently
selected month item;
calculate the current day value =
(( current horizontal position /
width of menu ) * range of days )
+1;
display current day value;
}
}
/* right_button released */
remove the menu;
if ( right_button released within menu )
return selected month and day value to the
application;
}
```
Copyright IBM Corporation 1988

While the invention has been particularly shown and described with reference to a preferred embodiment and other embodiments, it will be understood by those skilled in the art that various changes in form and detail may be made without departing from the spirit and scope of the invention. For example, various changes may include, but are not limited to, the interchangeability of references to either a horizontal direction or a vertical direction. In addition, a keyboard 15 (FIG. 2A) interaction or other input device can be used instead of using the mouse 16 input device as described herein. Also, the additional embodiments were shown as examples of the various uses of the present invention. It would be within the scope of this invention to implement the valuator menu of this invention in other embodiments not specifically discussed herein.

We claim:

1. A user interface for a data processing system, comprising:
means for displaying a list having a plurality of user actions; and means, coupled to said means for displaying, for simultaneously selecting one of said actions and a value within a range of values of said action.

2. A system for selecting an action in a data processing system, comprising:
means for displaying a list of items for a plurality of actions;

means, coupled to said means for displaying, for selecting one of said plurality of actions in response to a movement of a cursor in a first direction; and means, coupled to said list, for selecting a value of said action in response to a second movement of the cursor in a second direction within said item.

3. The system of claim 2 wherein the means for selecting a value further comprises means for displaying a dynamically updated indicator representing the value corresponding to a location of said cursor in said second direction.

4. A user interface for use with a screen display in a data processing system, said interface comprising:

means for moving a cursor in a first direction over a menu displaying a plurality of items;

means, coupled to said items, for correlating a range of values of each of said items relative to a position of said cursor within each one of said items of said menu;

means, coupled to said means for moving a cursor, for displaying a correlated value for said cursor position; and means, coupled to said means for displaying and said means for moving a cursor, for dynamically updating a displayed value as said cursor position changes.

5. The interface of claim 4 further comprising means, coupled to said menu, for simultaneously specifying, to an application running on said processing system, a selected item and the correlated value of said selected item, relative to the position of said cursor, by a single user input interaction.

6. A user interface for use with a screen display in a data processing system, said interface comprising:

means for displaying a menu having a plurality of color items;

means, coupled to said means for displaying, for positioning a cursor over at least one of said color items;

means, coupled to said color items, for correlating a saturation value within a range of a plurality of saturation values for each of said plurality of color items to a cursor position within at least one of said color items; and means, coupled to said menu, for simultaneously selecting one of said plurality of color items and said saturation value of said color item with a single input interaction.

7. A user interface for use with a screen display in a data processing system, said interface comprising:

means for displaying a menu having a plurality of font style items;

means, coupled to said means for displaying, for positioning a cursor over at least one of said font style items;

means, coupled to said font style items, for correlating a character pitch value within a range of a plurality of character pitch values for each of said plurality of font style items to a cursor position within said font style item; and means, coupled to said menu, for simultaneously selecting one of said plurality of font style items and said character pitch value of said font style item with a single input interaction.

8. A user interface for use with a screen display in a data processing system, said interface comprising:

means for displaying a menu having a plurality of items;

means, coupled to said means for displaying, for positioning a cursor over at least one of said items;

means, coupled to said items, for correlating a value within a range of a plurality of values for each of said plurality of items to a cursor position within said item; and means, coupled to said menu, for simultaneously selecting one of said plurality of items and said value of said item with a single input interaction.

9. A method for selecting an action in a data processing system, said method comprising:

displaying a menu having a plurality of user actions;

positioning a cursor within one of said actions of said menu; selecting simultaneously said action and a value within a range of a plurality of values of said action according to a position of the cursor within said action.

10. A method for selecting an action in a data processing system, said method comprising:

displaying means having a plurality of actions;

moving a cursor within said menu for selecting one of said plurality of actions; and moving a cursor within said action for selecting a value from a plurality of values of said action.

11. The method of claim 10 wherein the step of moving the cursor within said action further comprises the step of displaying a dynamically updated indicator representing the value of said action relative to a location of said cursor.

12. A method for selecting an action in a data processing system, said method comprising:

moving a cursor in a first direction over a menu displaying a plurality of items;

correlating a range of values of each of said items relative to a position of said cursor within each one of said items of said menu;

displaying a correlated value for said cursor position; and updating dynamically a displayed value as said cursor position changes.

13. The method of claim 12 further comprising the step of running simultaneously, to an application running on said processing system, a selected item and a correlated value of said selected item, relative to the position of said cursor, by a single user input interaction.

14. A method for selecting an action in a data processing system, said method comprising:

displaying a menu of a plurality of items;

positioning a cursor over at least one of said items;

correlating a value within a range of a plurality of values for each of said plurality of items to a cursor position within said item; and selecting simultaneously one of said plurality of items and said value of said item with a single input interaction.

15. A method for selecting an action in a data processing system, said method comprising:

displaying a list having a plurality of user actions; and selecting, simultaneously, one of said actions and a value within a range of values of said action.

16. A computer program comprising:

first instruction means for causing a display of a list having a plurality of user actions; and second instruction means, coupled to said first instruction means, for causing a simultaneous selection of one of said actions and a value within a range of values of said action in response to a single user interaction.

17. A computer program comprising:
first instruction means for causing a display of a menu having a plurality of items;
second instruction means, coupled to said first instruction means, for causing a correlation of a value within a range of a plurality of values for each of said plurality of items to a cursor position within said item; and
third instruction means, coupled to said second instruction means, for causing a simultaneous selection of one of said plurality of items and said value of said item in response to a single input interaction.

18. A computer program of claim 16 further comprising fourth instruction means, coupled to said second instruction means, for causing a display of the value correlated to said cursor position; and fifth instruction means, coupled to said fourth instruction means, for causing a dynamic update of the value displayed as said cursor position changes.

19. A computer program comprising:
first instruction means for causing a display of a menu having a plurality of user actions;
second instruction means, coupled to said first instruction means, for causing a simultaneous selection of one of said actions and a value within a range of a plurality of values of said action according to a position of a cursor within said action.

* * * * *

UNITED STATES PATENT AND TRADEMARK OFFICE
CERTIFICATE OF CORRECTION

PATENT NO. : 4,896,291

DATED : January 23, 1990

INVENTOR(S) : S. B. Gest et al

It is certified that error appears in the above-identified patent and that said Letters Patent is hereby corrected as shown below:

Col. 10, line 20, delete "means" and insert --a menu--.
Col. 10, line 42, delete "running" and insert --returning--.

Signed and Sealed this

Fourteenth Day of January, 1992

Attest:

HARRY F. MANBECK, JR.

*Attesting Officer*     *Commissioner of Patents and Trademarks*